United States Patent [19] [11] Patent Number: 4,775,765
Kimura et al. [45] Date of Patent: Oct. 4, 1988

[54] COORDINATE INPUT APPARATUS

[75] Inventors: Masahiro Kimura, Hitachi; Seiichi Hayashi, Mito; Etsurou Hirose, Hitachi; Masataka Inoue, Hitachi; Hidenobu Takahashi, Hitachi, all of Japan

[73] Assignee: Hitachi, Ltd., Tokyo, Japan

[21] Appl. No.: 935,334

[22] Filed: Nov. 26, 1986

[30] Foreign Application Priority Data

Nov. 28, 1985 [JP] Japan .............................. 60-267669
Nov. 28, 1985 [JP] Japan .............................. 60-267670
Feb. 24, 1986 [JP] Japan .............................. 61-37419

[51] Int. Cl.⁴ .............................................. G08C 21/00
[52] U.S. Cl. .................................... 178/18; 340/712; 338/99
[58] Field of Search .......................... 178/18, 19, 20; 340/706, 712, 718, 724, 784; 338/99, 114

[56] References Cited

U.S. PATENT DOCUMENTS 3,560,675  2/1971  Krakinowski ............... 340/712 X
4,017,848  4/1977  Tannas ........................ 340/712 X
4,208,648  6/1980  Naumann ....................... 178/18 X Primary Examiner—Stafford D. Schreyer
Attorney, Agent, or Firm—Antonelli, Terry & Wands

[57] ABSTRACT

A coordinate input apparatus including transparent upper and lower strip electrodes arranged to confront each other intersectionally with a transparent press-conductive member being placed between the upper and lower electrodes. The electrode arrangement formed on a transparent substrate is fitted on a display screen, allowing the operator to press the coordinate surface by the finger tip while viewing the display. An upper and lower strip electrodes become conductive by being pressed, generating a signal which represents the pressed position on the coordinates.

27 Claims, 6 Drawing Sheets

COORDINATE INPUT APPARATUS

BACKGROUND OF THE INVENTION

This invention relates to a coordinate input apparatus and, more particularly, to a coordinate input apparatus which employs the touch-panel system.

A coordinate input apparatus consists of a coordinate input element which detects the coordinate input position and a coordinate display element which display a pixel at a position corresponding to the coordinates detected by the coordinate input element. An example of the coordinate input apparatus employing the touch-panel system for the coordinate input element is described in U.S. Pat. No. 4,220,815.

Figure 1:
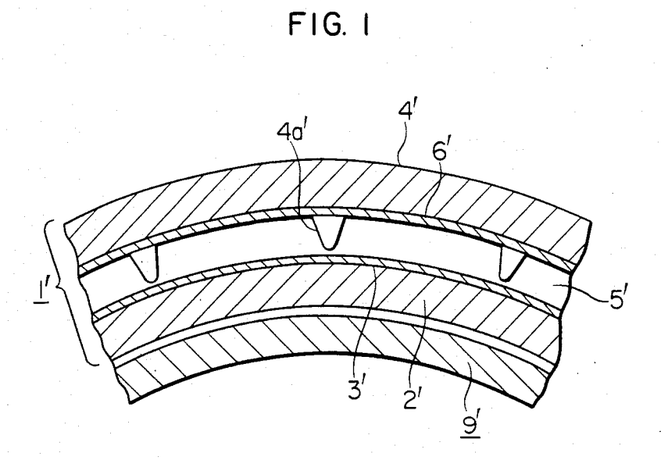
FIG. 1 is a partial cross-sectional diagram of the conventional coordinate input apparatus.

A conventional touch-panel type coordinate input apparatus will be described in the following with reference to FIGS. 1 and 2. In FIG. 1, symbol 1' generically denotes a coordinate input element, and symbol 9' generically denotes a coordinate display element employing the cathode ray tube (CRT) system or the liquid crystal system.

A transparent glass plate 2' which constitutes part of the coordinate input element 1' has its top surface coated by vapor deposition with a lower coordinate detecting electrode 3' made of transparent conductive material (e.g., indium oxide tin). The glass plate 2' is confronted with a certain spacing 5' by a transparent upper sheet 4' of the type of a flexible touch panel, and the lower surface of the upper sheet 4' is coated, in the same way as of the lower coordinate detecting electrode 3', with an upper coordinate detecting electrode 6' extending in the intersectional direction. In the figures, symbol 4a' denotes a boss which maintains a spacing between the glass plate 2' and the upper sheet 4', and the upper sheet 4' with its lower surface provided with the bosses 4a' and the upper coordinate detecting electrode 6' are assembled as shown in FIG. 2.

Figure 2:
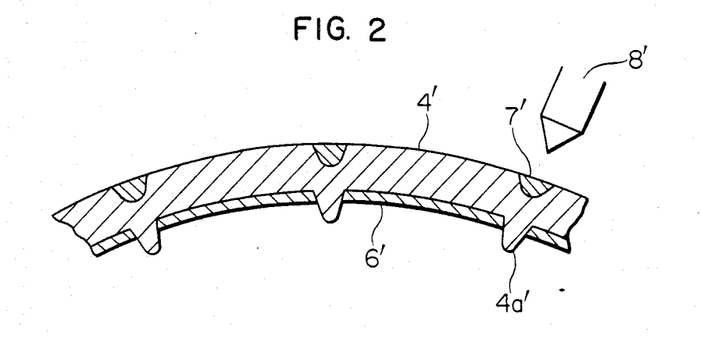
FIG. 2 is a partial cross-sectional diagram showing a manufacturing step of the coordinate input element of the above coordinate input apparatus.

In FIG. 2, the bosses 4a' extruding on the lower surface of the upper sheet 4' are pushed out below the upper coordinate detecting electrode 6' by using a punch 8', and dimples formed on the upper sheet 4' by punching are filled with transparent material 7', e.g., polyurethane coating. The coordinate input element 1' (glass plate 2' up the upper coordinate detecting electrode 6'), which is the confronting disposition of the upper and lower coordinate detecting electrodes 6' and 3', is mounted over a coordinate display element 9' emplying the CRT system or liquid crystal system, as shown in FIG. 1, and through the touch by the finger tip so that the upper sheet 4' of the coordinate input element 1' sinks flexibly, the upper coordinate detecting electrode 6' comes in contact with the lower coordinate detecting electrode 3', causing the generation of a coordinate input signal by their switching action.

SUMMARY OF THE INVENTION

This invention is made as a result of various repeated examinations with the intention of further improving the coordinate input apparatus employing the touch-panel system, and its prime object is to provide a reliable and improved touch-panel type coordinate input apparatus including a coordinate input element and a coordinate display element, which reduces the contact wear of the upper and lower coordinate detecting electrodes disposed to confront one coordinate input element and prevents the electrode contact resistivity from increasing due to the inferior operating environment of the electrodes, e.g., corrosion (oxidation and sulfuration) of the electrodes caused by high temperature and humidity and contamination of the electrodes, thereby reducing the cause of faults of the display apparatus of this type.

In order to achieve the above objective, the coordinate input apparatus according to this invention comprises a coordinate input element made up of transparent lower coordinate detecting electrodes provided over the upper surface of a transparent substrate and upper coordinate detecting electrodes disposed to confront the lower coordinate detecting electrodes in an orthogonal fashion so that a coordinate input position is detected by the switching action between the upper and lower coordinate detecting electrodes, and a coordinate display element which displays a pixel at a position corresponding to the coordinates detected by the coordinate input element, wherein a transparent intermediary is placed in the space between each intersectional portion of the upper and lower coordinate detecting electrodes.

DESCRIPTION OF THE PREFERRED EMBODIMENTS

Figure 3:
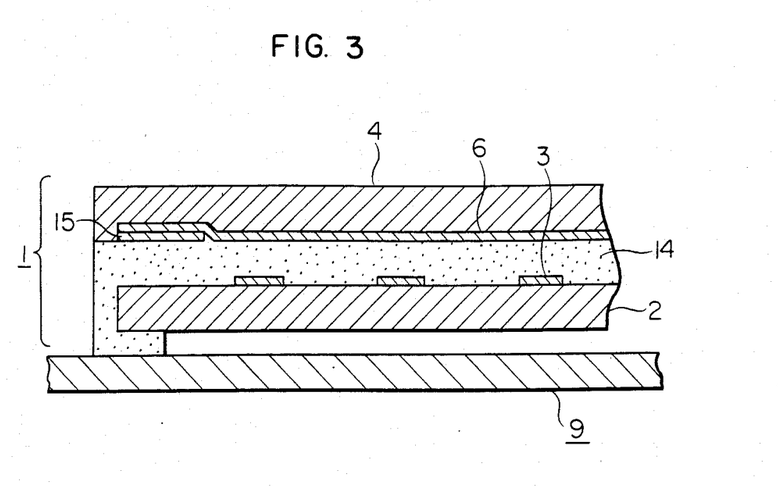
FIG. 3 is a partial cross-sectional diagram of the coordinate input apparatus embodying the present invention.
Figure 4:
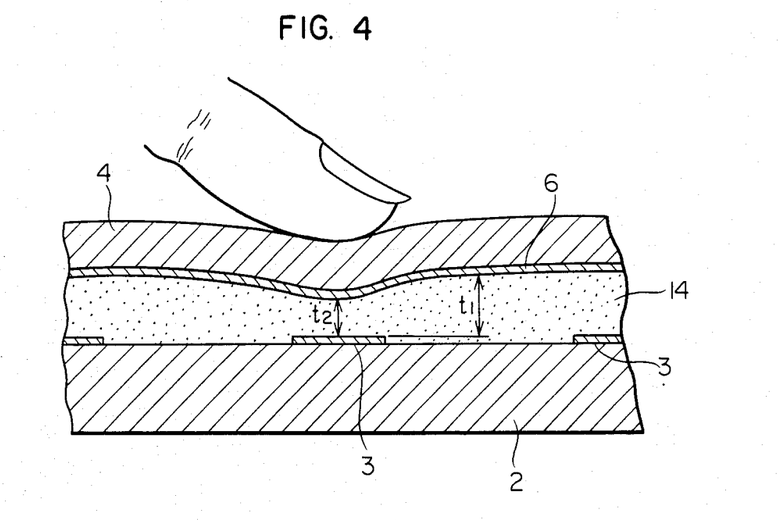
FIG. 4 is a partial cross-sectional diagram used to explain the operation of the coordinate input element of the above coordinate input apparatus.
Figure 5:
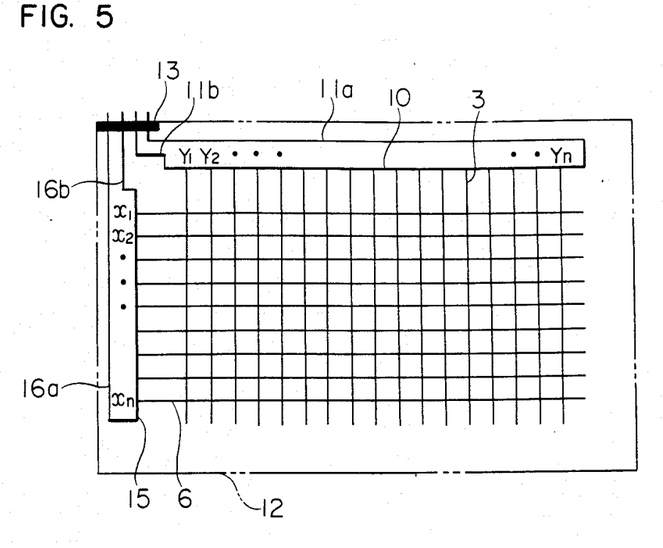
FIG. 5 is a schematic block diagram of the above coordinate input apparatus.

The present invention will be described in the following with reference to FIGS. 1, 2, 3, 4 and 5. In FIG. 3, symbol 1 generically denotes a coordinate input element and symbol 9 generically denotes a coordinate display element employing the CRT system or liquid crystal system. A transparent glass plate 2, which constitutes part of the coordinate input element 1, has its upper surface coated by vapor deposition with numerous lower coordinate detecting electrodes 3 made of transparent conductive material (e.g., indium oxide tin), as indicated by Y1, Y2, ..., Yn in FIG. 5, in a thickness of a few micrometers. In FIG. 5, symbol 10 denotes a carbon electrode deposited on the glass plate indicated by 2 in FIG. 3 so as to connect together one end of the lower coordinate detecting electrodes 3. The carbon electrode 10 has both ends connected by lead wires 11a and 11b to a terminal 13 provided at the corner of the board 12. In FIG. 3, the glass plate 2 with the lower coordinate detecting electrodes 3 fitted on its upper surface is provided by spraying to a certain thickness with a coat of transparent press-conductive rubber 14 which is a film of silicone rubber intermixed with conductive metallic particles, and the press-conductive rubber 14 is sprayed to cover the edge of the glass plate 2 as shown in FIG. 3. The press-conductive rubber 14 has its upper surface coated by vapor deposition to a thickness of a few micrometers with numerous upper coordinate detecting electrodes 6 made of transparent conductive material, as shown by symbols X1, X2, ..., Xn in FIG. 5, in the same fashion as of the lower coordinate detecting electrodes 3. In FIG. 3, symbol 15 denotes a carbon electrode which is deposited on the press-conductive rubber 14 so as to connect together one end of the upper coordinate detecting electrodes 6, and the carbon electrode 15 has both ends connected by lead wires 16a and 16b to the terminal 13 provided at the corner of the board 12 as in the case of the lower coordinate detecting electrodes 3. The press-conductive rubber 14 with the upper coordinate detecting electrodes 6 fitted on its upper surface is provided by spraying with a transparent upper sheet 4 of the type of a flexible touch panel, e.g., a thin film of silicone rubber or plastic sheet, and the coordinate input element 1 made up of the glass plate 2, lower coordinate detecting electrode 3, upper sheet 4, upper coordinate detecting electrodes 6 and press-conductive rubber 14 is mounted over a coordinate display element 9 employing the CRT system or liquid crystal system.

Next, the operating system of the inventive coordinate input apparatus arranged as described above will be described. In the illustrated embodiment, the transparent press-conductive rubber film 14 made of silicone rubber intermixed with conductive metallic particles is formed by spraying to a constant thickness at the position between the glass plate 2 with the lower coordinate detecting electrodes 3 fitted on its upper surface and the upper sheet 4 with the upper coordinate detecting electrodes 6 on its lower surface, and therefore when the upper sheet 4 of the coordinate input element 1 is sunk resiliently by the touch of the finger tip as shown in FIG. 4, the press-conductive rubber 14 has its thickness reduced from the initial thickness t1 to t2, which brings about a decrease in the resistivity from a few megohms to a few ohms, and this switching action between the upper coordinate detecting electrode 6 and the lower coordinate detecting electrode 3 generates a certain coordinate input signal.

According to the foregoing embodiment of this invention, the use of the press-conductive rubber 14, which is temporarily deformed resiliently by the pressure at a gap section of the coordinate input element 1, makes possible the formation of a non-contact switching mechanism between the upper coordinate detecting electrodes 6 fitted on the upper sheet 4 and the lower coordinate detecting electrodes 3 fitted on the glass plate 2, whereby both electrodes 6 and 3 can effectively be prevented from wearing. The placement of the press-conductive rubber 14 between the upper coordinate detecting electrodes 6 and the lower coordinate detecting electrodes 3 fitted on the glass plate 2 effectively prevents the formation of an oxide film or sulfide film on the upper and lower coordinate detecting electrodes 6 and 3 due to high temperature and humidity and also the deposition of dirt on the electrodes 6 and 3.

The press-conductive rubber 14 which is temporarily deformed resiliently by the application of pressure is glued integrally over the entire surface of the upper and lower coordinate detecting members, i.e., the upper sheet 4 and the glass plate 2, and integral gluing of the upper sheet 4 and glass plate 2 to the press-conductive rubber 14 avoids the influence of humidity in the coordinate input element 1 and further ensures the corrosion-preventive effect for the upper and lower coordinate detecting electrodes 6 and 3.

Figure 6:
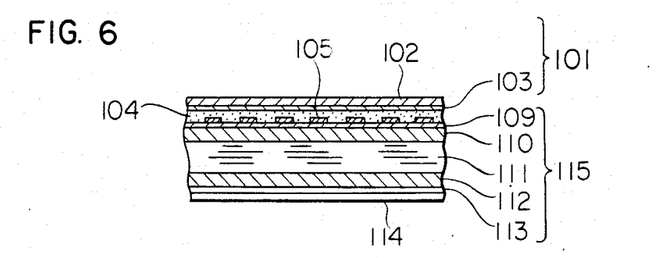
FIG. 6 is a partial cross-sectional diagram of the coordinate input apparatus according to another embodiment of this invention.

Next, another embodiment of this invention will be described with reference to FIG. 6. The figure shows a partial, longitudinal cross-section of the touch-panel type coordinate input apparatus at its principal portion (an integrated principal portion of the coordinate input element and display element), in which symbols 102 through 105 denote the components of the coordinate input element 101, i.e., 102 being an upper sheet, 103 being an upper coordinate detecting electrode, 104 being a press-conductive rubber and 105 being a lower coordinate detecting electrode, and symbols 109 through 114 denote the components of the coordinate display element 115, i.e., 109 being an upper polarizing plate, 110 being an upper glass plate, 111 being a liquid crystal layer, 112 being a lower glass plate, 113 being a lower polarizing plate and 114 being a reflection plate. In the embodiment of FIG. 6, the numerous lower coordinate detecting electrodes 105 made of transparent conductive material are fitted by sputtering or vapor deposition on the upper surface of the upper polarizing plate 109 which constitutes part of the coordinate display element 115, and above the upper polarizing plate 109 fitted on its upper surface with the lower coordinate detecting electrodes 105 there is disposed the upper sheet 102 for the coordinate input element 101 interposed by the press-conductive rubber 104, with the lower surface of the upper sheet 102 being fitted by sputtering or vapor deposition with the numerous upper coordinate detecting electrodes 103 made of transparent conductive material constituting part of the coordinate input element 101 in the same fashion as of the lower coordinate detecting electrodes 105.

It is possible for this coordinate input apparatus to eliminate the lower glass plate 2 used in the coordinate input apparatus shown in FIGS. 3 and 4, which enables a thinner construction of the overall apparatus and enhanced light transmissivity for the coordinate display element 115, and this not only improves the accuracy of the display apparatus of this type, but also reduces the size and weight of the product using less amount of material owing to the absence of the lower glass plate 2 and at the same time achieves the cost reduction of the product.

Figure 7:
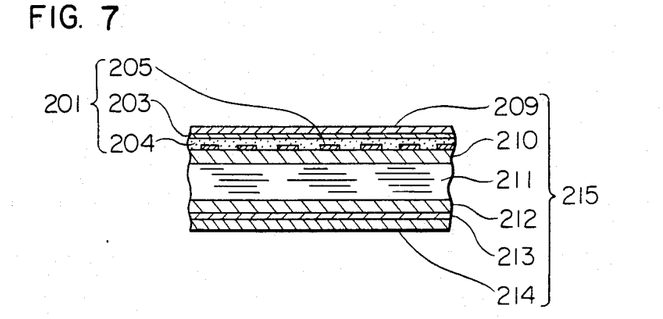
FIG. 7 is a partial cross-sectional diagram of the coordinate input apparatus according to still another embodiment of this invention.

Next, still another embodiment of this invention will be described with reference to FIG. 7. In FIG. 7, symbols 203 through 205 denote the components of the coordinate input element 201, i.e., 203 being an upper coordinate detecting electrodes, 204 being a press-conductive rubber and 205 being a lower coordinate detecting electrodes, and symbols 209 through 214 denote the components of the coordinate display element 215, i.e., 209 being a flexible upper polarizing plate used as a touch panel, 210 being an upper glass plate, 211 being a liquid crystal layer, 212 being a lower glass plate, 213 being a lower polarizing plate and 214 being a reflection plate. In the embodiment of FIG. 7, numerous lower coordinate detecting electrodes 205 made of transparent conductive material (the lower coordinate detecting electrodes 205 constituting part of the coordinate input element) are fitted by sputtering or vapor deposition on the upper surface of the upper glass plate 210 which constitutes part of the coordinate display element 215, and above the upper glass plate 210 fitted on its upper surface with the lower coordinate detecting electrodes 205 there is disposed the upper polarizing plate 209 for the coordinate display element 115 interposed by the press-conductive rubber 4, with numerous upper coordinate detecting electrodes 203 made of transparent conductive material constituting part of the coordinate input element 201 being fitted by sputtering or vapor deposition on the lower surface of the upper polarizing plate 209 in the same fashion as of the lower coordinate detecting electrodes 205.

This coordinate input apparatus can eliminate the upper sheet 4 and the lower glass plate 2 used in the coordinate input apparatus shown in FIGS. 3 and 4, which further reduces the thickness of the overall apparatus and improves the light transmissivity of the coordinate display element, whereby the product can be made more compact and less weight using less amount of material and more significant cost reduction of the product is achieved.

Figure 8:
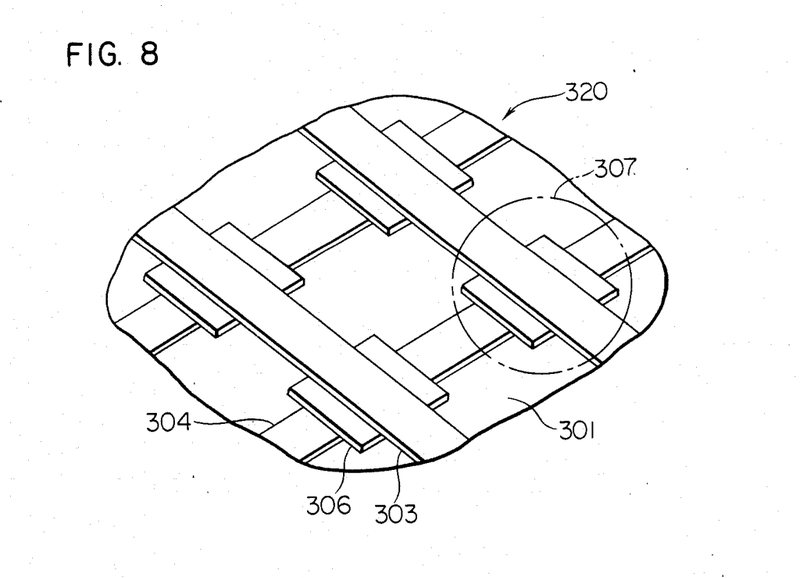
FIG. 8 is a partial perspective view of the coordinate input apparatus according to a further embodiment of this invention.

Next, a still different embodiment of this invention will be described with reference to FIGS. 8 through 11. In FIG. 8, a glass plate 301 is transparent and it has on its surface a parallel disposition of lower coordinate detecting electrodes 304 at a certain interval. Disposed over the lower coordinate detecting electrodes 304 are upper coordinate detecting electrodes 303 in an orthogonal relationship with the lower coordinate detecting electrodes 304. One of the lower coordinate detecting electrodes 304 or upper coordinate detecting electrodes 303 may be provided expediently as positive or negative electrodes. The lower coordinate detecting electrodes 304 and upper coordinate detecting electrodes 303 are interleaved at their intersectional portions 307 by insulation films 306 so that both electrodes do not short.

These lower coordinate detecting electrodes 304, upper coordinate detecting electrodes 303 and insulation films 306 are formed by vapor deposition or the like on the surface of the glass plate 301. The thickness of deposition is desirably small in order to stabilize the contact of input operation, and it is 3 to 4 micrometers in this embodiment. For the material of the lower and upper coordinate detecting electrodes, indium oxide alloy or the like having high transparency may be used.

Figure 9:
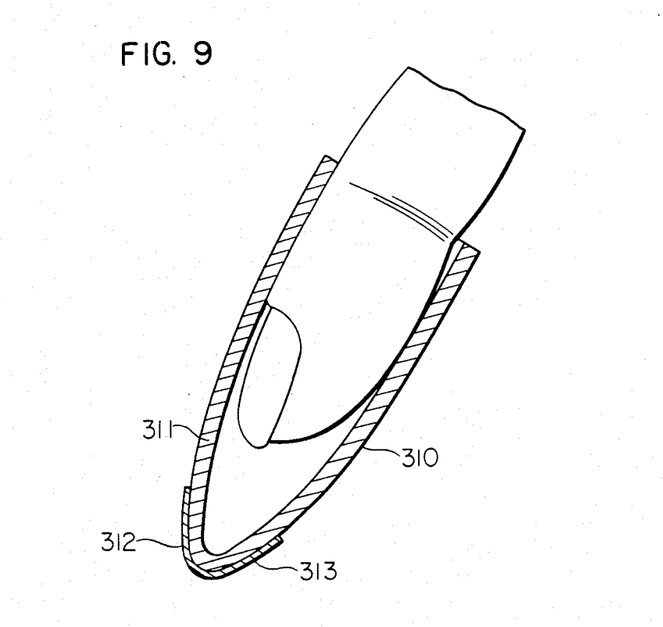
FIG. 9 is a diagram showing the structure of the cap fitted on the finger tip when making an input operation on the apparatus.

In FIG. 9, a cap 310 is formed of resilient resin or the like, with a conductive contactor 313 being provided on the surface of its tip section 312. The finger tip is inserted into the cap 310 for the input operation as shown in FIG. 9.

Figure 10:
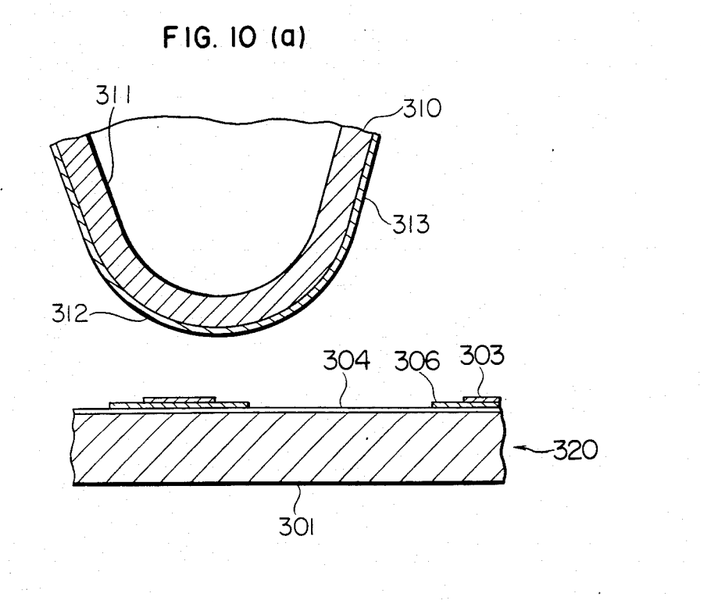
FIGS. 10(a), 10(b) are a set of diagrams explaining the input operation using the finger cap shown in FIG. 9.

In FIG. 10, the lower coordinate detecting electrode 304 and upper coordinate detecting electrode 303 arranged on the plate glass 301 are interleaved by the insulation film 306, and therefore both electrodes are open electrically (FIG. 10(a)). As shown in FIG. 10(b), the tip section 312 of the cap 310 is made contact with the intersectional portion 307 of both electrodes 304 and 303, and the lower coordinate detecting electrode 304 and upper coordinate detecting electrode 303 are shorted through the contactor 313, whereby the coordinates of the contact position can be detected. By placing the input apparatus atop the display apparatus 320 such as a CRT and LCD (not shown), the operatior is allowed to make a direct input operation while viewing the screen.

Figure 11:
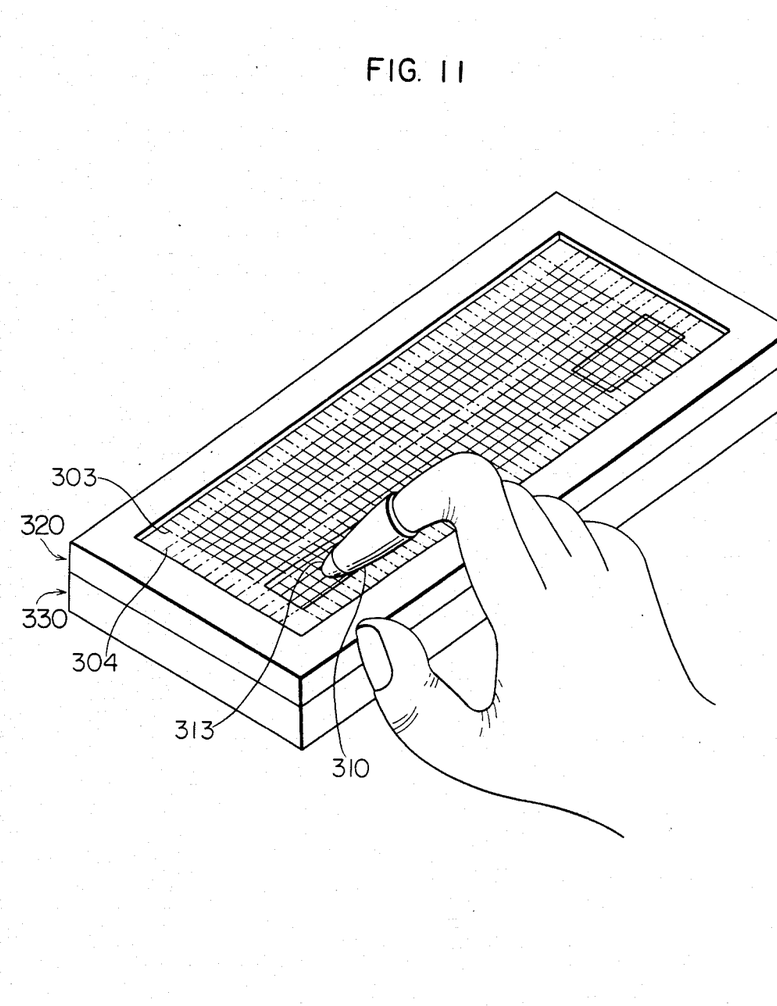
FIG. 11 is a perspective view of the inventive coordinate input apparatus used in conjunction with a liquid crystal display panel in a portable computer set.

FIG. 11 shows an embodiment of this invention in which the foregoing input apparatus 320 is used with a liquid crystal display apparatus 330 in a portable computer set.

The coordinate input apparatus described above achieves the following effectiveness.

(1) The open structure for the electrode sections 304 and 303, instead of the conventional sealed structure, allows easy cleaning for the contamination of electrodes due to the deposition or dirt.

(2) The open structure for the electrode sections 304 and 303 prevents special corrosive gases from drifting around the gas-susceptible electrode surface.

(3) Avoidance of the vertical glued structure for the electrode sections 304 and 303 prevents the expansion, contraction, peeling and displacement of the upper and lower members caused by environmental changes in temperature and humidity.

We claim:

1. A coordinate input apparatus comprising a coordinate input element for detecting a coordinate position and a coordinate display element for displaying a pixel at a position corresponding to the coordinates detected by said coordinate input element, said coordinate input element being constructed such that transparent lower coordinate detecting electrodes are fitted on the upper surface of a lower transparent substrate, transparent upper coordinate detecting electrodes are fitted on the lower surface of an upper transparent substrate, said upper transparent substrate having resiliency is disposed above said lower transparent substrate so that said lower coordinate detecting electrodes and upper coordinate detecting electrodes confront each other with a spacing provided therebetween and in an intersectional arrangement, a transparent press-conductive resilient member is filled in the space between the upper surface of said lower transparent substrate including said lower coordinate detecting electrodes and the lower surface of said upper transparent substrate including said upper coordinate detecting electrodes, so that a coordinate input position is detected by the switching action between said upper and lower coordinate detecting electrodes accompanied by a resilient deformation of said press-conductive member, said upper transparent substrate and said upper coordinate detecting electrodes.

2. A coordinate input apparatus according to claim 1, wherein said lower coordinate detecting electrodes and upper coordinate detecting electrodes are formed as thin films on said lower transparent substrate and upper transparent substrate, respectively, by vapor deposition.

3. A coordinate input apparatus according to claim 2, wherein said lower coordinate detecting electrodes and upper coordinate detecting elecrodes are made of indium oxide tin.

4. A coordinate input apparatus according to claim 2, wherein said lower coordinate detecting electrodes and upper coordinate detecting electrodes are multiple in number.

5. A coordinate input apparatus according to claim 2, wherein said lower coordinate detecting electrodes and upper coordinate detecting electrodes have a thickness of a few micrometers.

6. A coordinate input apparatus according to claim 1, wherein said lower transparent substrate comprises a glass plate.

7. A coordinate input apparatus according to claim 1, wherein said press-conductive resilient member is formed of silicon rubber intermixed with conductive metallic particles, said member being coated by spraying on the upper surface of said lower transparent substrate in a constant thickness.

8. A coordinate input apparatus according to claim 7, wherein said lower transparent substrate comprises a glass plate, said press-conductive resilient member being sprayed to cover the edge and a portion of the lower surface of said glass plate, a spacing being provided between the upper surface of said coordinate display element and the lower surface of said glass plate.

9. A coordinate input apparatus according to claim 2, wherein said upper transparent substrate is made of silicon rubber.

10. A coordinate input apparatus according to claim 1, wherein said coordinate display element comprises a cathode ray tube system.

11. A coordinate input apparatus according to claim 1, wherein said coordinate display element comprises a liquid crystal system.

12. A coordinate input apparatus according to claim 1, wherein said press-conductive resilient member is glued integrally on the entire surfaces of said lower transparent substrate and said upper transparent substrate located above and below said member.

13. A coordinate input apparatus comprising a coordinate input element for detecting a coordinate input position and a coordinate display element for displaying a pixel at a position corresponding to the coordinates detected by said coordinate input element, said coordinate input element being constructed such that a plurality of transparent lower coordinate detecting electrodes are formed as thin films by vapor deposition on the upper surface of a lower transparent glass plate, a lower carbon electrode is formed by vapor deposition on the upper surface of said lower transparent glass plate so as to connect together one end of said lower coordinate detecting electrodes, a plurality of transparent upper coordinate detecting electrodes are formed as thin films by vapor deposition on the lower surface of an upper transparent substrate, an upper carbon electrode is formed by vapor deposition on the lower surface of said upper transparent substrate so as to connect together one end of said upper coordinate detecting electrodes, said lower carbon electrode and upper carbon electrode are connected at their both ends through respective lead wires to a terminal provided at the corner of a board, said upper transparent substrate is disposed above said lower transparent glass plate so that said lower coordinate detecting electrodes and upper coordinate detecting electrodes confront each other with a spacing provided therebetween and in an intersectional arrangement, and a transparent press-conductive resilient member is filled in the space between the upper surface of said lower transparent glass plate including said lower coordinate detecting electrodes, lower carbon electrode and associated lead wires and the lower surface of said upper transparent substrate including said upper coordinate detecting electrodes, upper carbon electrode and associated lead wires, so that a coordinate input position is detected by the switching action between upper and lower coordinate detecting electrodes accompanied by a resilient deformation of said press-conductive member, said upper transparent substrate and said upper coordinate detecting electrodes.

14. A coordinate input apparatus according to claim 13, wherein said terminal is provided in proximity to the corner of said board close to said lower and upper carbon electrodes.

15. A coordinate input apparatus comprising a coordinate input element for detecting a coordinate input position and a coordinate display element for displaying a pixel at a position corresponding to the coordinates detected by said coordinate input element, said coordinate input element being constructed such that transparent lower coordinate detecting electrodes are provided, upper coordinate detecting electrodes are fitted on the lower surface of an upper transparent substrate, and said upper transparent substrate having resiliency is disposed so that said lower coordinate detecting electrodes and said upper coordinate detecting electrodes confront each other with a spacing provided therebetween and in an intersectional arrangement, so that a coordinate input position is deteacted by the switching action between said upper and lower coordinate detecting electrodes accompanied by a resilent deformation of said upper transparent substrate and said upper coordinate detecting electrodes, said lower coordinate detecting electrodes being fitted on the upper surface of a transparent member which constitutes part of said coordinate display element, and wherein said upper coordinate detecting electrodes and lower coordinate detecting electrodes are interleaved by a press-conductive rubber.

16. A coordinate input apparatus comprising a coordinate input element including transparent lower coordinate detecting electrodes and transparent upper coordinate detecting electrodes disposed to confront each other with a spacing provided therebetween and in an intersectional arrangement so that a coordinate input position is detected by a switching action between said upper and lower coordinate detecting electrodes accompanied by a resilient deformation of said upper coordinate detecting electrodes, and a coordinate display element operating to display a pixel at a position corresponding to the coordinates detected by said coordinate input element, said lower coordinate detecting electrodes being fitted on the upper surface of a transparent plate which constitutes part of said coordinate display element, an upper polarizing plate which constitutes part of said coordinate display element being provided with flexibility, said upper coordinate detecting electrodes being fitted on the lower surface of said upper polarizing plate.

17. A coordinate input apparatus according to claim 16, wherein aid upper coordinate detecting electrodes and lower coordinate detecting electrodes are interleaved by a press-conductive rubber.

18. A coordinate input apparatus comprising a coordinate input element including transparent lower coordinate detecting electrodes fitted on the upper surface of a transparent substrate and upper coordinate detecting electrodes disposed over said lower coordinate detecting electrodes in an intersectionally, confronting fashion so that a coordinate input position is detected by a switching action between said upper and lower coordinate detecting electrodes, and a coordinate display element which displays a pixel at a position corresponding to the coordinates detected by said coordinate input element, a transparent intermediary being partly provided in the spacing at each intersectional portion between said upper and lower coordinate detecting electrodes, said upper and lower coordinate detecting electrodes being exposed to the outside.

19. A coordinate input apparatus according to claim 18, wherein said lower coordinate detecting electrodes are formed by vapor deposition on the upper surface of said transparent substrate and said upper coordinate detecting electrodes are formed by vapor deposition on the upper surface of said transparent substrate over said intermediary.

20. A coordinate input apparatus according to claim 18, wherein said intermediary has a lateral width slightly larger than the lateral width of said lower coordinate detecting electrodes.

21. A coordinate input apparatus according to claim 1, wherein said transparent press-conductive resilient member is a rubber member.

22. A coordinate input apparatus according to claim 1, wherein said transparent press-conductive resilient member is sufficiently thin to be transparent but yet present an electrical resistance greater than one megaohm, the switching action between said upper and lower coordinate detecting electrodes and the accompanying deformation of said transparent press-conductive resilient member effecting a reduction of electrical resistance in a localized region to a few ohms.

23. A coordinate input apparatus according to claim 18, wherein said lower coordinate detecting electrodes have a thickness of several micrometers.

24. A coordinate input apparatus according to claim 13, wherein said lower coordinate detecting electrodes have a thickness of several micrometers.

25. A coordinate input apparatus according to claim 18, wherein said lower coordinate detecting electrodes are coated as thin films on said transparent substrate by vapor deposition.

26. A coordinate input apparatus according to claim 18, wherein said lower and upper coordinate detecting electrodes are made of indium oxide tin.

27. A coordinate input apparatus according to claim 18, wherein said lower coordinate detecting electrodes have a thickness of several micrometers.

* * * * *